US009959757B2

(12) United States Patent
Modica et al.

(10) Patent No.: US 9,959,757 B2
(45) Date of Patent: May 1, 2018

(54) METHOD AND APPARATUS FOR AUTOMATED SERVICE SCHEDULE DERIVATION AND UPDATING

(71) Applicant: HERE GLOBAL B.V., Eindhoven (NL)

(72) Inventors: Leo Modica, Wheaton, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days. days.

(21) Appl. No.: 15/485,542

(22) Filed: Apr. 12, 2017

(65) Prior Publication Data

US 2017/0270791 A1 Sep. 21, 2017

Related U.S. Application Data

(63) Continuation of application No. 13/780,901, filed on Feb. 28, 2013, now Pat. No. 9,659,495.

(51) Int. Cl.
*G06G 1/00* (2006.01)
*G08G 1/123* (2006.01)
(Continued)

(52) U.S. Cl.
CPC ............ *G08G 1/123* (2013.01); *G01C 21/34* (2013.01); *G01S 19/42* (2013.01); *G06Q 10/1097* (2013.01)

(58) Field of Classification Search
None
See application file for complete search history.

(56) References Cited

U.S. PATENT DOCUMENTS 4,926,343 A 5/1990 Tsuruta et al.
5,948,040 A * 9/1999 DeLorme .............. G01C 21/36 340/990

(Continued)

FOREIGN PATENT DOCUMENTS

EP 1 796 058 A1 6/2007
GB 2 178 210 A 2/1987

OTHER PUBLICATIONS

CTA [online][retrieved May 3, 2013] Retrieved from the Internet: <URL: http://www.ctabustracker.com/bustime/map/displaymap.jsp > 1 page.

(Continued)

*Primary Examiner* — Gurkanwaljit Singh
(74) *Attorney, Agent, or Firm* — Alston & Bird LLP

(57) ABSTRACT

A method, apparatus and computer program products are provided for automatically determining or fine-tuning bus service schedules for bus stops along a route. One example method includes causing reception of GPS data from a plurality of buses or uses from along a transit route, the GPS data comprised of a plurality of location points and associated temporal data, aggregating the location data by route and direction to determine a trip count, causing reception of at least one bus stop location, partitioning the associated temporal data into a number of clusters in accordance with the trip count, calculating a mean arrival time at the at least one bust stop for each cluster, and generating, using a processor, at least one service schedule for the at least one bus stop, wherein the mean arrival time of each cluster represents the service schedule.

20 Claims, 7 Drawing Sheets

(51) Int. Cl.
*G06Q 10/10* (2012.01)
*G01C 21/34* (2006.01)
*G01S 19/42* (2010.01)

(56) References Cited

U.S. PATENT DOCUMENTS

| | | | | |
|---|---|---|---|---|
| 5,959,577 | A | 9/1999 | Fan et al. | |
| 5,987,377 | A | 11/1999 | Westerlage et al. | |
| 6,700,506 | B1 | 3/2004 | Winkler et al. | |
| 7,003,398 | B2 | 2/2006 | Seligmann | |
| 9,659,495 | B2 | 5/2017 | Modica et al. | |
| 2004/0122884 | A1 | 6/2004 | Lee | |
| 2004/0260470 | A1 | 12/2004 | Rast | |
| 2008/0054072 | A1 | 3/2008 | Katragadda et al. | |
| 2011/0112759 | A1* | 5/2011 | Bast | G01C 21/3423 701/533 |
| 2012/0010803 | A1* | 1/2012 | Min | G08G 1/123 701/117 |
| 2013/0060468 | A1* | 3/2013 | Delling | G06Q 10/047 701/527 |
| 2013/0317747 | A1* | 11/2013 | Chidlovskii | G06N 5/02 701/540 |
| 2014/0142996 | A1* | 5/2014 | Skyer | G07B 15/00 705/5 |

OTHER PUBLICATIONS

Extended European Search Report from corresponding European Patent Application No. 14152592, dated Jul. 29, 2014.

United States Patent and Trademark Office, Office Action for U.S. Appl. No. 13/780,901, dated Jun. 12, 2015, 25 pages, U.S.A.

United States Patent and Trademark Office, Office Action for U.S. Appl. No. 13/780,901, dated Oct. 7, 2015, 29 pages, U.S.A.

United States Patent and Trademark Office, Office Action for U.S. Appl. No. 13/780,901, dated Feb. 25, 2016, 29 pages, U.S.A.

United States Patent and Trademark Office, Office Action for U.S. Appl. No. 13/780,901, dated Jul. 1, 2016, 14 pages, U.S.A.

United States Patent and Trademark Office, Office Action for U.S. Appl. No. 13/780,901, dated Nov. 3, 2016, 15 pages, U.S.A.

United States Patent and Trademark Office, Notice of Allowance for U.S. Appl. No. 13/780,901, dated Feb. 27, 2017, 5 pages, U.S.A.

* cited by examiner

20

METHOD AND APPARATUS FOR AUTOMATED SERVICE SCHEDULE DERIVATION AND UPDATING

CROSS-REFERENCE TO RELATED APPLICATIONS

This application claims priority to U.S. patent application Ser. No. 13/780,901, filed on Feb. 28, 2013, which is hereby incorporated herein in its entirety by reference.

TECHNOLOGICAL FIELD

Embodiments of the present invention relate generally to a method, apparatus, and computer program product for automatically determining or fine-tuning bus service schedules for bus stops along a route.

BACKGROUND

Given a new transit service, determining an accurate schedule that the buses service is a time consuming, complex, and expensive task for transit agencies. For example, if a new transit agency pre-plans their schedule before the first day of service, the expected service schedule is most likely inaccurate since bus arrival times depend on many conditions such as weather, traffic conditions, weekday or weekend etc. Thus, there are variations to the pre-planned schedule or expected service schedules. Furthermore, for an existing transit service (e.g., Chicago's CTA or New York's MTA) that already knows their service schedule, determining new service schedules or fine tuning the existing service schedule after an incident such as a construction or accident and the buses are re-routed from their original routes just as time consuming, complex and expensive. Currently, a manual approach is taken by all transit agencies today whereby people go into the field (i.e. transit service area) with GPS devices and collect and annotate route data over several days. The present invention relates to a newly developed approach that is fully automated where instead of workers going into the field, buses belonging to the transit service produce a new or fine-tuned schedule.

BRIEF SUMMARY

A method, apparatus and computer program product are therefore provided according to an example embodiment of the present invention to determine routes of a transit system.

An algorithm is proposed to automatically derive or fine-tune time table or frequency based transit service schedule. Using the buses themselves as probes for a period of time, an actual number of trips for each route the transit agency services is computed. Given the number of trips for the candidate route and historical arrival times for buses (i.e. probes) at a candidate bus stop, these two data sets are utilized as inputs to an unsupervised schedule derivation algorithm. The output is the K transit service schedules for that bus stop. In one example embodiment, using sensor (e.g. GPS) traces obtained from buses over a predetermined period of time, the traces are passed through a route aggregator that aggregates traces that are on the same route and direction. These are then passed to a trip computer that computes the number of trips on a route daily. This value trip count value is represented as K. Given K and the route aggregates, the schedule derivation server then generates K service schedules for each bus stop along the route. Each service schedule produced using this technology has an interval of confidence that improves the traveler's chance of catching the bus. The confidence is obtained from statistical properties of the K clusters formed in the service schedule generation process.

One example method may include causing reception of location data, the location data comprised of a plurality of location points and associated temporal data, aggregating the location data by route and direction to determine a trip count, causing reception of at least one bus stop location, partitioning the associated temporal data into a number of clusters in accordance with the trip count, calculating a mean arrival time at the at least one bust stop for each cluster, and generating, using a processor, at least one service schedule for the at least one bus stop, wherein the mean arrival time of each cluster represents the service schedule.

In one embodiment, the method may further include determining a number of weekday trips; and generating a weekday service schedule. In another embodiment, the method may comprise determining a number of weekend trips; and generating a weekend service schedule.

Additionally or alternatively, the method may further comprise determining a location of one or more bus stops as a function of the location data. In another embodiment, the method may include calculating the mean arrival time by factoring only a first location point received for each trip at the bus stop. The method may further include re-partitioning the temporal data associated with each of the location points according to the calculated mean arrival time. The method may also include comprising re-calculating the mean arrival time in accordance with the re-partitioned clusters.

An example apparatus may include at least one processor and at least one memory storing computer program code, wherein the at least one memory and stored computer program code are configured, with the at least one processor, to cause the apparatus to receive location data, the location data comprised of a plurality of location points and associated temporal data, aggregate the location data by route and direction to determine a trip count, receive at least one bus stop location, partition the associated temporal data into a number of clusters in accordance with the trip count, calculate a mean arrival time at the at least one bust stop for each cluster, and generate at least one service schedule for the at least one bus stop, wherein the mean arrival time of each cluster represents the service schedule.

The at least one memory and stored computer program code are further configured, with the at least one processor, to cause the apparatus to determine a number of weekday trips; and generate a weekday service schedule. In one embodiment, the at least one memory and stored computer program code are further configured, with the at least one processor, to cause the apparatus to determine a number of weekend trips; and generate a weekend service schedule.

In one embodiment the at least one memory and stored computer program code are further configured, with the at least one processor, to cause the apparatus to determine a location of one or more bus stops as a function of the location data. In another embodiment, the at least one memory and stored computer program code are further configured, with the at least one processor, to cause the apparatus to calculate the mean arrival time by factoring only a first location point received for each trip at the bus stop. The at least one memory and stored computer program code may be further configured, with the at least one processor, to cause the apparatus to re-partition the temporal data associated with each of the location points according to the calculated mean arrival time. The at least one memory and stored computer program code may also be further configured, with the at least one processor, to cause the apparatus to re-calculate the mean arrival time in accordance with the re-partitioned clusters.

In a further embodiment, a computer program product is provided that includes at least one non-transitory computer-readable storage medium having computer-readable program instructions stored therein, the computer-readable program instructions includes program instructions configured for causing reception of location data, the location data comprised of a plurality of location points and associated temporal data, aggregating the location data by route and direction to determine a trip count, causing reception of at least one bus stop location, partitioning the associated temporal data into a number of clusters in accordance with the trip count, calculating a mean arrival time at the at least one bust stop for each cluster, and generating, using a processor, at least one service schedule for the at least one bus stop, wherein the mean arrival time of each cluster represents the service schedule.

In an alternative embodiment, the computer-readable program instructions also include program instructions configured for determining a number of weekday trips; and generating a weekday service schedule. In one embodiment, the computer-readable program instructions also include program instructions configured for determining a number of weekend trips; and generating a weekend service schedule.

The computer-readable program instructions may also include program instructions configured for determining a location of one or more bus stops as a function of the location data. In another embodiment, the computer-readable program instructions also include program instructions configured for calculating the mean arrival time by factoring only a first location point received for each trip at the bus stop. The computer-readable program instructions also include program instructions configured for re-partitioning the temporal data associated with each of the location points according to the calculated mean arrival time. The computer-readable program instructions may also include program instructions configured for re-calculating the mean arrival time in accordance with the re-partitioned clusters.

One example apparatus may include means for causing reception of location data, the location data comprised of a plurality of location points and associated temporal data, aggregating the location data by route and direction to determine a trip count, causing reception of at least one bus stop location, partitioning the associated temporal data into a number of clusters in accordance with the trip count, calculating a mean arrival time at the at least one bust stop for each cluster, and generating, using a processor, at least one service schedule for the at least one bus stop, wherein the mean arrival time of each cluster represents the service schedule.

In an alternative embodiment, the apparatus may further include means for determining a number of weekday trips; and generating a weekday service schedule. In one embodiment, the apparatus may further include means for determining a number of weekend trips; and generating a weekend service schedule. Additionally or alternatively, the apparatus may further include means for determining a location of one or more bus stops as a function of the location data.

In another embodiment, the apparatus may further include means for calculating the mean arrival time by factoring only a first location point received for each trip at the bus stop. The apparatus may further include means for re-partitioning the temporal data associated with each of the location points according to the calculated mean arrival time. The apparatus may further include means for re-calculating the mean arrival time in accordance with the re-partitioned clusters.

BRIEF DESCRIPTION OF THE DRAWINGS

Figure 1:
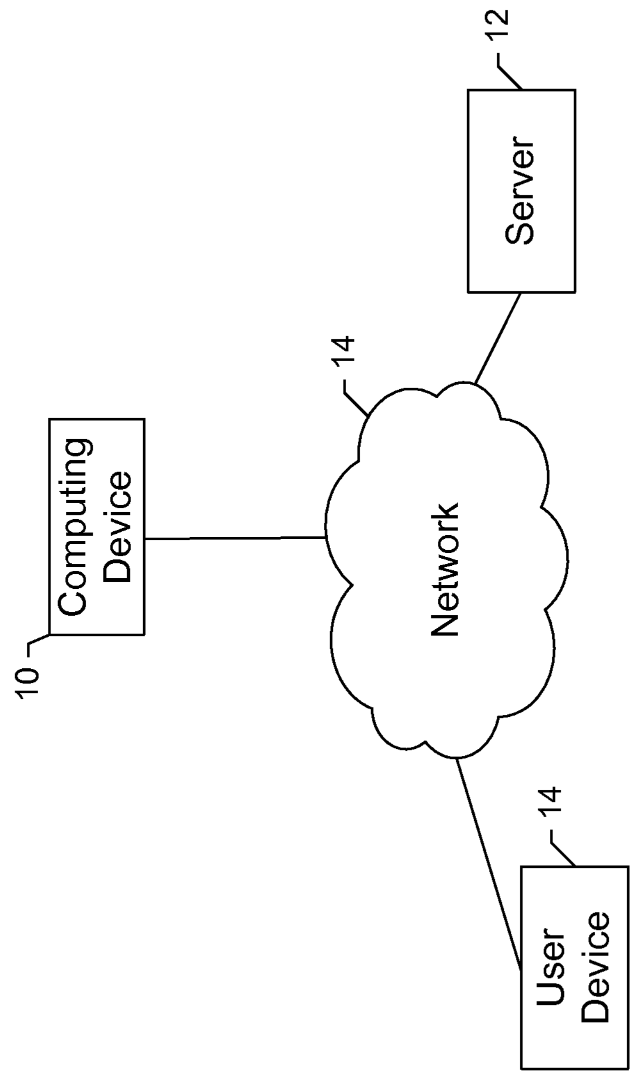
Figure 2:
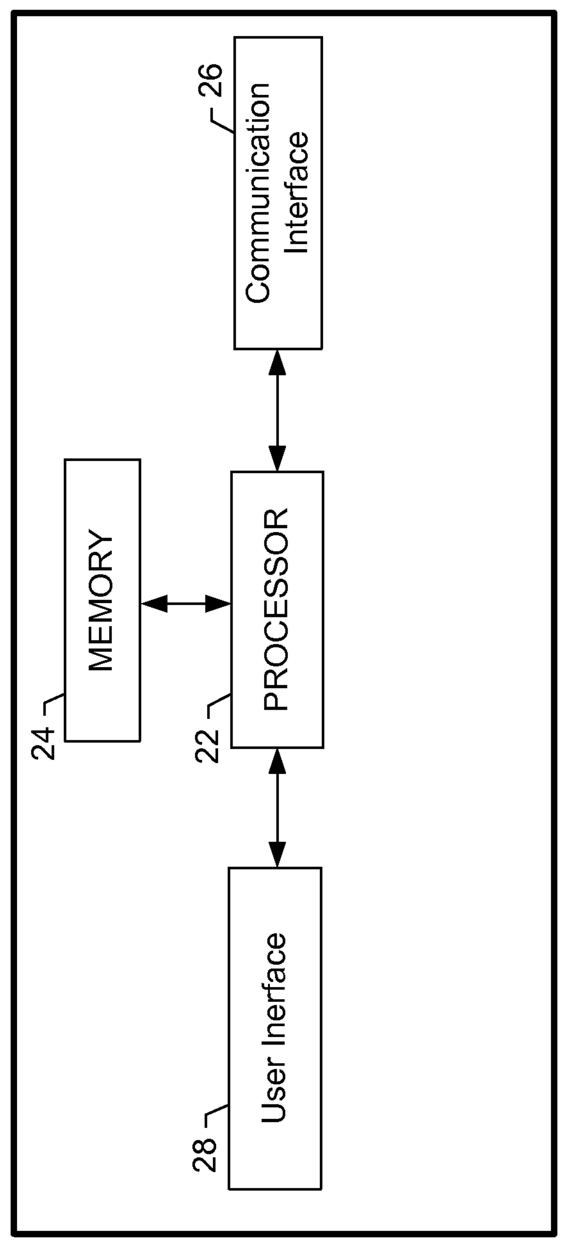
Figure 3:
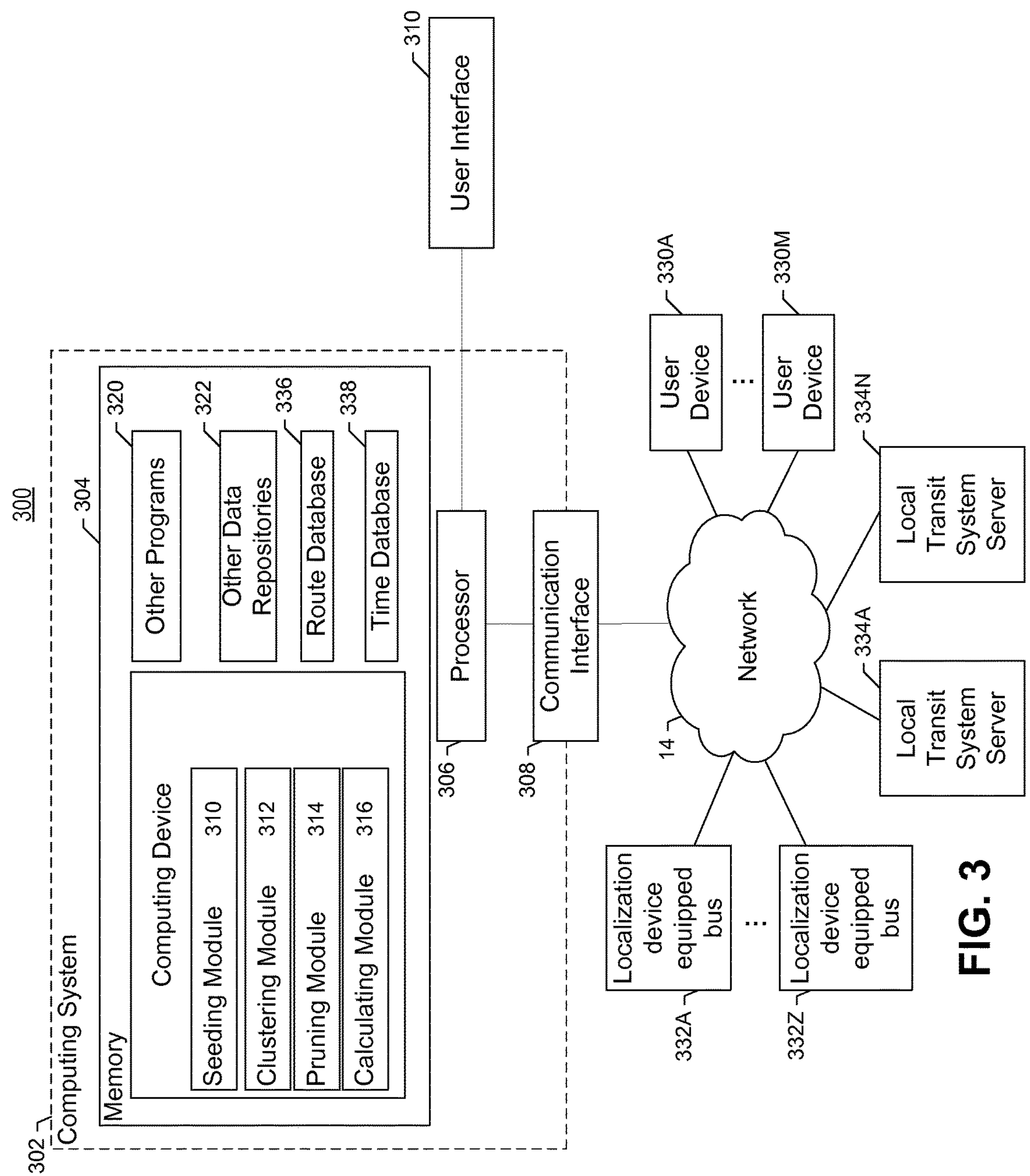

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is a block diagram of an apparatus that may be specifically configured in accordance with an example embodiment of the present invention.

Figure 4:
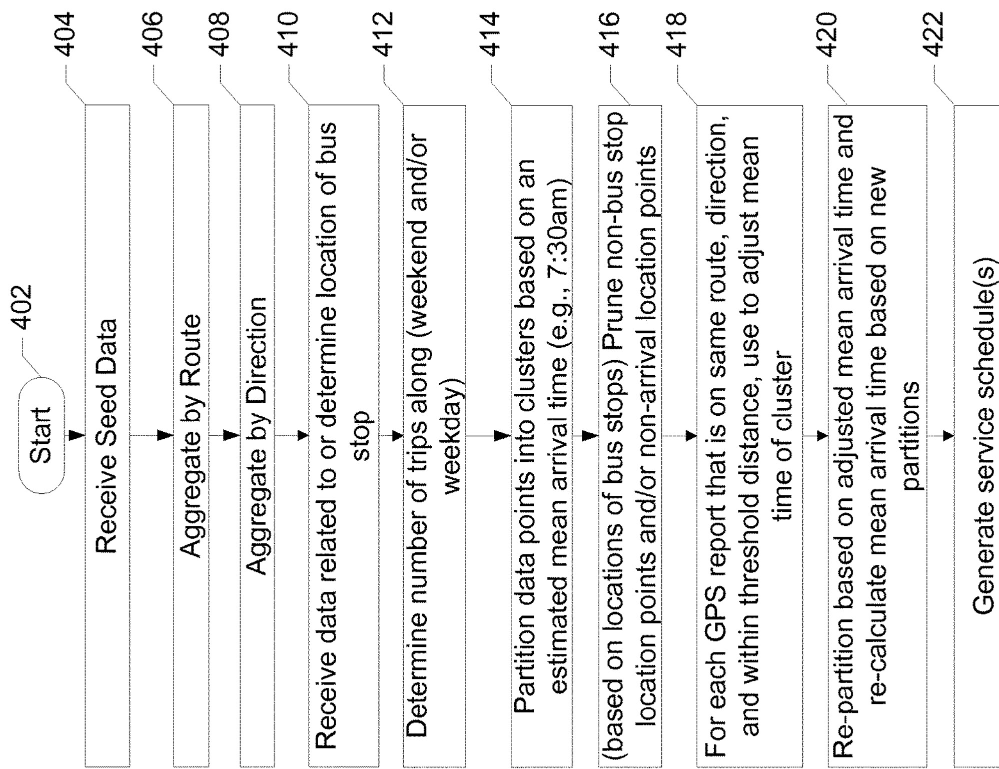
Figure 5A:
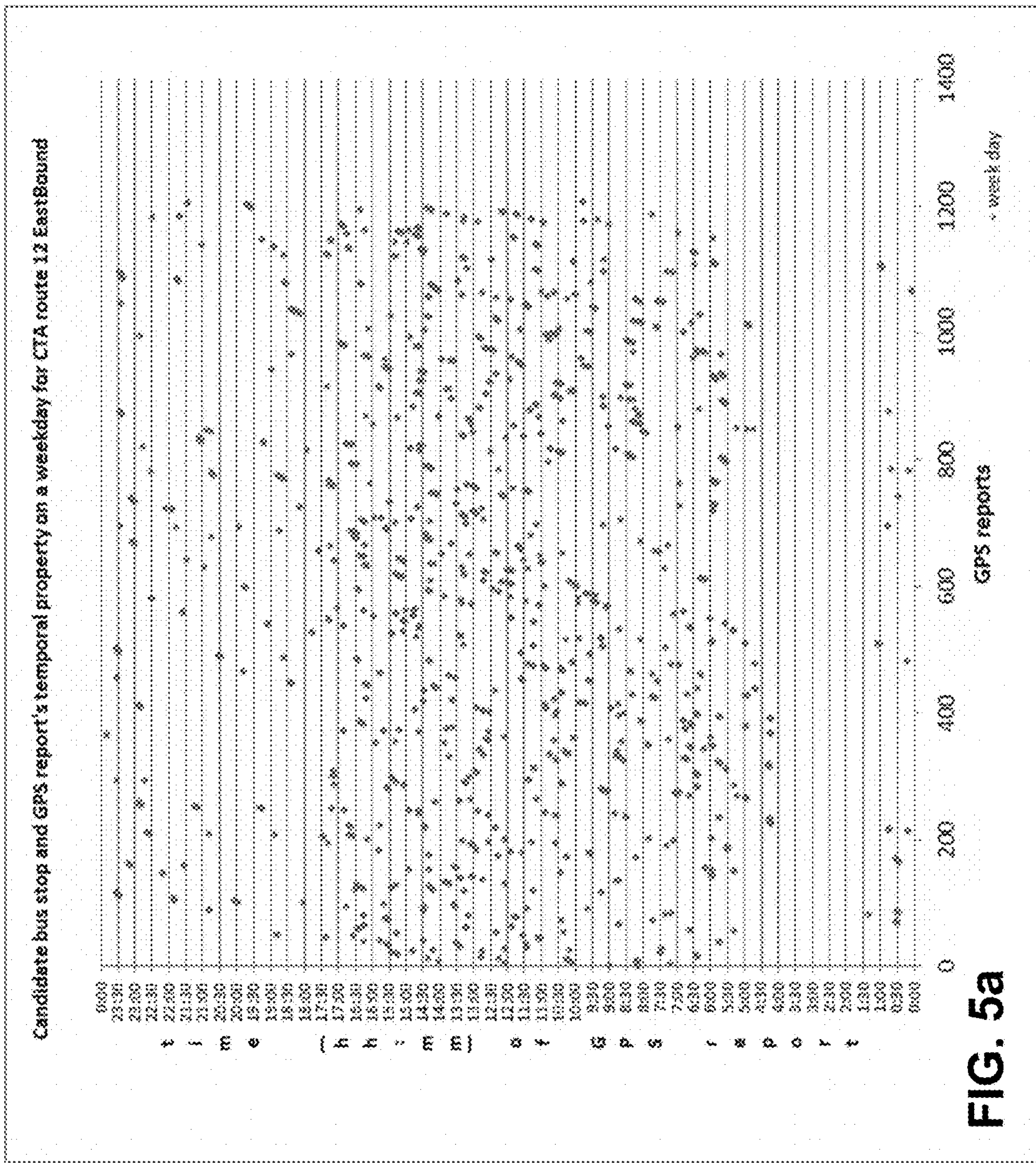
Figure 5B:
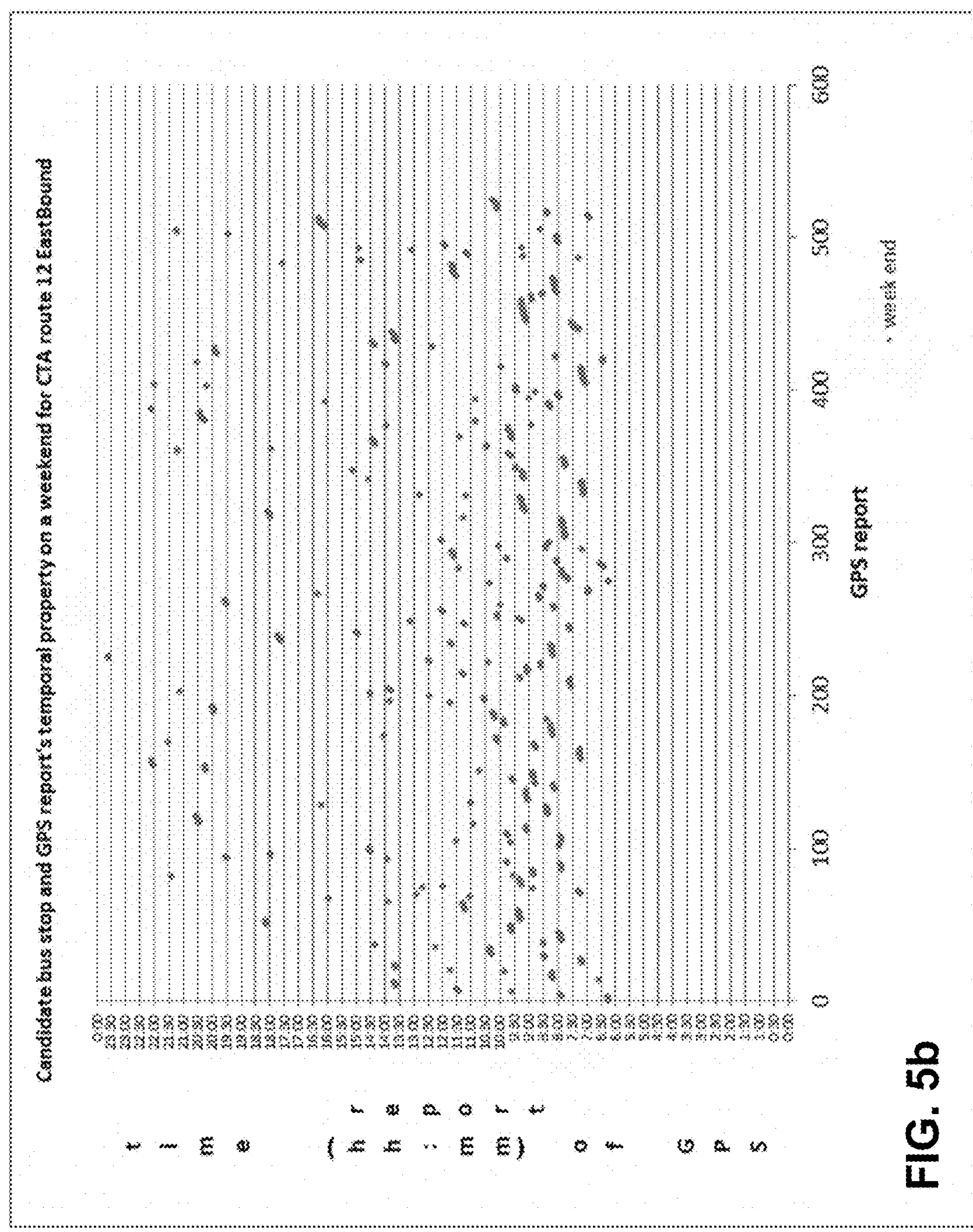
Figure 6:
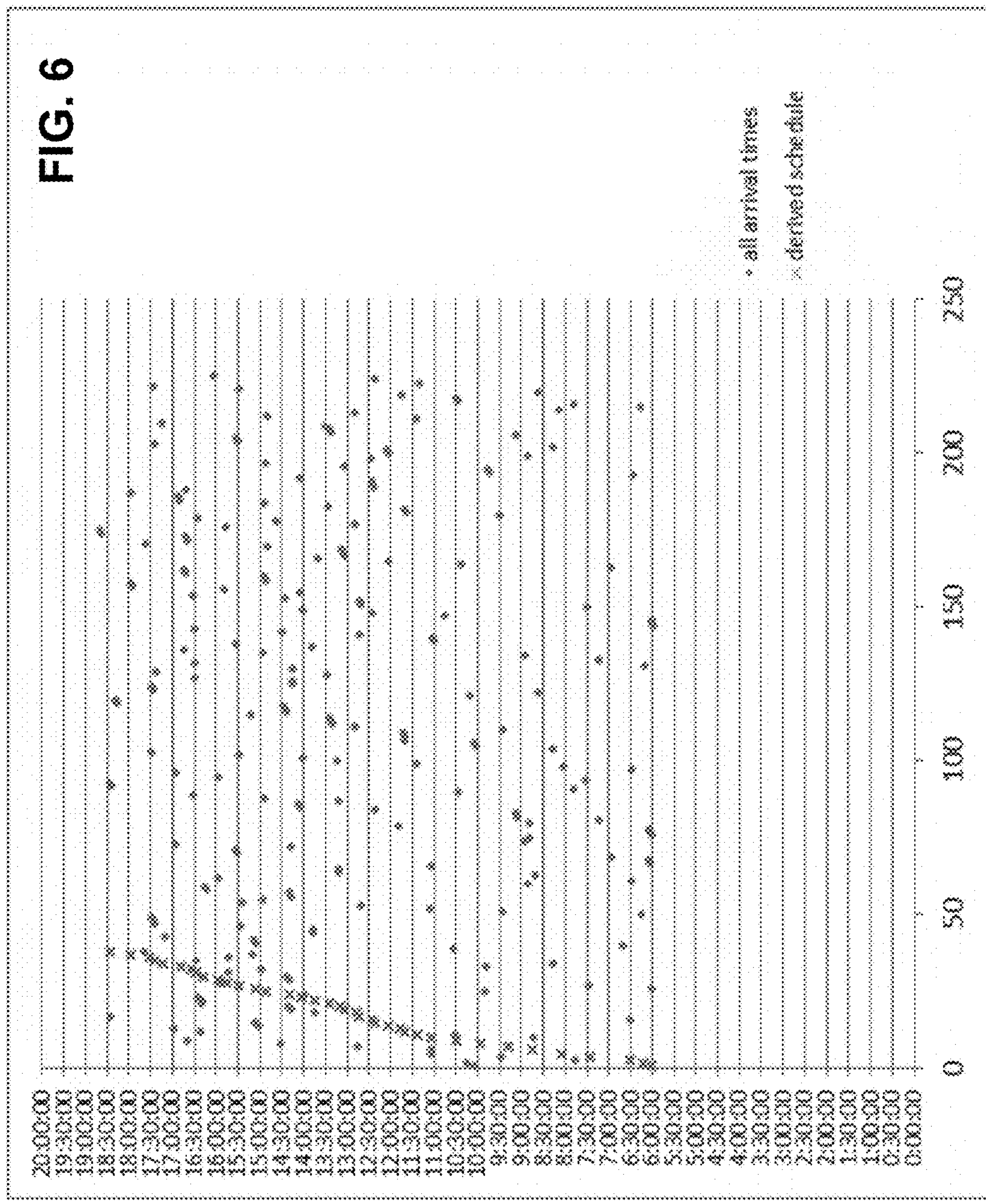

FIG. 4 is an example flowchart illustrating a method of operating an example apparatus in accordance with an embodiment of the present invention;

FIGS. 5A and 5B show illustrations exemplifying graphs according to an embodiment of the present invention depicting arrival time of busses at a single arbitrary bus stop on weekdays and weekends respectively; and FIG. 6 shows an illustration exemplifying an example derived schedule according to one embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device. The user device 14 may be embodied by a computing device, and in one embodiment, may be comprised of a plurality of computing devices.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

FIG. 3 is an example block diagram of an example computing system 300 for practicing embodiments of an automated transit route derivation system 302. In particular, FIG. 3 shows a system 300 that may be utilized to implement an automated transit route derivation system 302. Note that one or more general purpose or special purpose computing systems/devices may be used to implement the automated transit route derivation system 302. In addition, the system 302 may comprise one or more distinct computing systems/devices and may span distributed locations. Furthermore, each block shown may represent one or more such blocks as appropriate to a specific embodiment or may be combined with other blocks. For example, in some embodiments the system 302 may contain a seeding module 312, a clustering module 314, a pruning module 316, an calculating module 318 or a combination thereof. In other example embodiments, the seeding module 312, the clustering module 314, the pruning module 316, and/or the calculating module 318 may be configured to operate on separate systems (e.g. a mobile terminal and a remote server, multiple remote servers and/or the like). For example, the seeding module 312, the clustering module 314, the pruning module 316, and/or the calculating module 318 may be configured to operate on a mobile terminal. Also, automated transit route derivation system 302 may be implemented in software, hardware, firmware, or in some combination to achieve the capabilities described herein.

While the system 302 may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, system 302 comprises a computer memory ("memory") 304, one or more processors 306 (e.g. processing circuitry) and a communications interface 308. The computing device(s) are shown residing in memory 304. In other embodiments, some portion of the contents, some or all of the components of the automated transit route derivation device 302 may be stored on and/or transmitted over other computer-readable media. The components of the automated transit route derivation device 302 preferably execute on one or more processors 306 and are configured to receive transit data and derive a transit route, schedule, and/or stops. Other code or programs 320 (e.g., an administrative interface, a Web server, and the like) and potentially other data repositories, such as data repository 322, also reside in the memory 304, and preferably execute on processor 306. Of note, one or more of the components in FIG. 3 may not be present in any specific implementation.

In a typical embodiment, as described above, the automated transit route derivation system 302 may include a seeding module 312, a clustering module 314, a pruning module 316, an calculating module 318 or a combination thereof. The seeding module 312, the clustering module 314, the pruning module 316, the calculating module 318 or a combination thereof may perform functions such as those outlined in FIG. 1. The automated transit route derivation system 302 interacts via the network 14 via a communications interface 308 with (1) mobile terminals 330, (2) localization device equipped bus(es) 332 and/or (3) local transit system servers 334. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 308 may be capable of operating with one or more air interface standards, communication protocols, modulation types, access types, and/or the like. More particularly, the system 302, the communications interface 308 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the automated transit route derivation system 302 may be implemented using standard programming techniques. For example, the automated transit route derivation system 302 may be implemented as a "native" executable running on the processor 306, along with one or more static or dynamic libraries. In other embodiments, the automated transit route derivation system 302 may be implemented as instructions processed by a virtual machine that executes as one of the other programs 320. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VB Script, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the automated transit route derivation system 302, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the automated transit route derivation system 302 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on a user's mobile communications device 10. An HTML5 or JavaScript™ "app" allows web page script to contact a server 12, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

FIG. 4 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware)

to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 4, when executed, convert a computer or processing circuitry into a particular machine configured to perform an example embodiment of the present invention. Accordingly, the operations of FIG. 4 define an algorithm for configuring a computer or processing to perform an example embodiment. In some cases, a general purpose computer may be provided with an instance of the processor which performs the algorithms of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 4 is an example flowchart illustrating a method of operating an example computing system performed in accordance with an embodiment of the present invention. As shown in block 404 of FIG. 4, the apparatus 20 embodied by the computing device 10 may therefore be configured to receive seed data. The apparatus embodied by the computing device therefore includes means, such as the processor 22, the communication interface 26 or the like, for causing reception of the seed data.

A specific example in the context of an embodiment of the present invention may be causing the reception of one or more GPS traces obtained from GPS devices. In one embodiment, GPS traces may be received as seed data. In another embodiment, the raw GPS traces may be organized by route and/or direction and then may be received as seed data. Furthermore, two data collection strategies may be used (1) Participatory sensing (PS)—Humans submit GPS or other sensor reports via check-in and/or (2) a kind of opportunistic sensing (OS) whereby the GPS device is on a bus and submits GPS reports periodically. Here, a GPS trace $t_1$ is formed.

As shown in block 406 of FIG. 4, the apparatus 20 embodied by the computing device 10 may therefore be configured to aggregate the seed data by route. The apparatus embodied by the computing device therefore includes means, such as the processor 22, the communication interface 26 or the like, for aggregating the seed data by route.

As shown in block 408 of FIG. 4, the apparatus 20 embodied by the computing device 10 may therefore be configured to aggregate the seed data by direction. The apparatus embodied by the computing device therefore includes means, such as the processor 22, the communication interface 26 or the like, for aggregating the seed data by direction.

In another embodiment of the present invention, the data may be aggregated by day of the week. For example, a bus schedule may be different on weekends than weekdays.

As shown in block 410 of FIG. 4, the apparatus 20 embodied by the computing device 10 may therefore be configured to receive data related to or determine a location of one or more bus stops. The apparatus embodied by the computing device therefore includes means, such as the processor 22, the communication interface 26 or the like, for causing reception of data relating to or determining a location of one or more bus stops.

FIG. 5*a* is an example graph showing the arrival times for a single arbitrary bus stop on a weekday over a data collection period. FIG. 5*b* is an example graph showing the arrival times for a single arbitrary bus stop on a weekend day over the data collection period. From the Figures, it may be evident that the two schedules are different. First, the weekend schedule has fewer trips. Additionally, for weekdays, the buses appear to stop running after midnight and restore operation around 4:00 am. On weekdays, this route seems to be the busiest between 6:00 am and 6:00 pm. On the other hand, on weekends, the buses appear to stop running before midnight, (e.g., 10:00 pm) and restore operation at in the morning (i.e. 6:00 am). This route appears busiest between 7:00 am and 2:00 pm on weekends. The service schedules for any arbitrary bus stop may be extracted given arrival times (e.g. the figures above) as observed and/or received from the location data (e.g., bus's submitted GPS reports). In one embodiment, some routes may be express routes and may be active only during peak travel time. These express routes generally have fewer buses, fewer trips, and fewer GPS reports. Furthermore, in another embodiment, a single bus stop may be on several routes, As shown in block 412 of FIG. 4, the apparatus 20 embodied by the computing device 10 may therefore be configured to determine a number of trips along a route in one direction. The apparatus embodied by the computing device therefore includes means, such as the processor 22, the communication interface 26 or the like, for determining a number of trips along a route in one direction. In one embodiment of the present invention, the apparatus 20 may be configured to determine a number of weekday trips and/or a number of weekend trips.

For exemplary purposes, given a set of bus stops $s_1, s_2, s_3, \ldots, s_n$ and a set of trips $t_1^{di}, t_2^{di}, t_3^{di}, \ldots, t_m^{di}$ on an arbitrary day di along a route rt as obtained from the collected GPS traces such that any trip $t_j^{di}$ contains a sequence of arrival times for each bus stop $s_k$. More specifically, each trip $t_i^{di}=\{a_1^j, a_2^j, a_3^j, \ldots, a_m^j\}$ may include a set of arrival times, each instance of the arrival time for bus stop $s_p$ is represented by $a_p^j$. In general, from the sets of trips $\{t_1^{d1}, t_2^{d1}, t_3^{d1}, \ldots, t_m^{d1}\}$, $\{t_1^{d2}, t_2^{d2}, t_3^{d2}, \ldots, t_m^{d2}\}$, $\{t_1^{d3},$ $t_2^{d3}, t_3^{d3}, \ldots, t_m^{d3}\} \ldots \{t_1^{d|d|}, t_2^{d|d|}, t_3^{d|d|}, \ldots t_m^{d|d|}\}$ two sets of schedules (i.e. weekday and weekend) for each $s_k$ may be derived.

As shown in block 414 of FIG. 4, the apparatus 20 embodied by the computing device 10 may therefore be configured to partition location points into clusters based on arrival times. The apparatus embodied by the computing device therefore includes means, such as the processor 22, the communication interface 26 or the like, for partitioning location points into clusters based on arrival times. In one embodiment, the calculated number of trips along the route determines the number of clusters. For example, if step 412 determines that 16 trips are taken on a specific route per day, step 416 may partition the location points into 16 clusters. In one embodiment, each of the location points is assigned to one of the 16 clusters.

In one embodiment, the clusters are formed around estimated arrival times.

In one embodiment, partitioning may be done by k-means clustering. Specifically, k-means clustering is a method of cluster analysis which aims to partition n observations into k clusters in which each observation belongs to the cluster with the nearest mean. In the context of the above example, given a set of arrival or departure time observations $(a_1, a_2, \ldots, a_n)$, for a single bus stop where each observation is a 1-dimensional real vector representing the temporal property of the GPS reports, k-means unsupervised learning scheme may be utilized to partition the n observations into k sets $(k \le n)$ $S=\{S_1, S_2, \ldots, S_k\}$ so as to minimize the within-cluster sum of squares.

For example:

$$\arg\min_S \sum_{i=1}^{k} \sum_{X_j \in S_i} \|X_j - \mu_i\|^2$$

where $\mu_i$ is the mean of points in $S_i$.

Each of the derived k clusters may include information about the k service schedules for each trip of the bus stop of interest. From the set of GPS reports for a route rt consisting of the set of stops $s_1, s_2, s_3, \ldots s_m$, schedules for each stop $s_i$ may be extracted separately.

As shown in block 416 of FIG. 4, the apparatus 20 embodied by the computing device 10 may therefore be configured to prune location points. The apparatus embodied by the computing device therefore includes means, such as the processor 22, the communication interface 26 or the like, for pruning location points. In one embodiment of the present invention, location points that are not located near enough to a bus stop are pruned. For example, the apparatus 20 may be configured to determine whether a location point is located beyond a threshold distance (e.g., 200 m) from a bus stop and not use that point in any calculation. Additionally or alternatively, location points that are determined to be at bus stops but are not the first arrival point may be pruned. For example, the apparatus 20 may receive a plurality of GPS reports from a bus while it sits at a bus stop waiting for passengers to board. The apparatus may be configured to not use the second, third, or fourth points in calculating an arrival time.

In the context of the above example, for $s_i$, GPS reports that are not related to $s_i$, are suppressed or pruned. It may be determined that a GPS report is related to $s_i$ if the GPS report was submitted when the bus approaches or departs from $s_i$ using a distance threshold thres with a route constraint. The system parameter thres may be a distance measure in meters utilized to indicate when a bus approaches or departs from a bus stop (e.g., 200 m).

As shown in block 418 of FIG. 4, the apparatus 20 embodied by the computing device 10 may therefore be configured to calculate a mean arrival time for each cluster based on each location point within that cluster. The apparatus embodied by the computing device therefore includes means, such as the processor 22, the communication interface 26 or the like, for calculating a mean arrival time for each cluster based on each location point within that cluster.

In the context of the above example, step 418 takes as input, sample feature vectors $a_1, a_2, a_3, \ldots, a_{|a|}$ which represents temporal properties of all the GPS reports in the system for a particular candidate route and bus stop for weekdays or weekends. The sample feature vectors fall into k compact clusters, $k<|a|$. The value of k is the number of trips on the route. The k value may be pre-computed for a candidate bus stop by the proposed algorithm and may be different for weekdays and weekend days.

Furthermore, a bus stop detection algorithm may determine the location of the bus stops. In an alternative embodiment, bus stop location data is received. Given the bus stop locations, the present invention may then cluster the GPS reports that were submitted while the bus approaches or departs from the bus stop using thres and other constraints such as route verification as discussed. Then, for each stop $s_k$ on the route, the k clusters maintain the properties of its k service schedules. More specifically, each cluster's mean is the service schedule. In one embodiment, a variance of each cluster may be used as a confidence interval to improve the possibility of a traveler catching the bus.

As shown in block 420 of FIG. 4, the apparatus 20 embodied by the computing device 10 may therefore be configured to re-partition the location points according to the calculated mean arrival times for each cluster. The apparatus embodied by the computing device therefore includes means, such as the processor 22, the communication interface 26 or the like, for re-partitioning the location points according to the calculated mean arrival times for each cluster.

In one embodiment, $m_i$ may be the mean of the vectors in cluster i. Since the clusters may be well separated, a minimum-distance classifier may be used to separate them. That is, x may be in cluster i if $\|x-m_i\|$ is the minimum of all the k distances. For exemplary purposes, the following procedure may be utilized for finding the service schedules for a candidate stop $s_k$ on any given route:

Start

Compute the number of trips k on the candidate route. For any route we have two values for k, one for weekends and the other for weekdays.

Make initial guesses for the means m1, m2, . . . , mk

Until there are no changes in any mean

Use the estimated means to classify the samples into k clusters, each representing an arrival time for a trip at bus stop s_p on the route For GPS report i from 1 to k If GPS report on same route and direction and dist (GPS report, bus stop)<thres Replace mi with the mean of the temporal properties of all of the samples for cluster i end_for end_until end As shown in block 422 of FIG. 4, the apparatus 20 embodied by the computing device 10 may therefore be configured to generating a service schedule for at least one bus stop. The apparatus embodied by the computing device therefore includes means, such as the processor 22, the communication interface 26 or the like, for generating a service schedule for at least one bus stop. In one embodiment, the mean arrival time of each cluster represents the service schedule.

FIG. 6 shows a snapshot of the derived schedule for a bus stop using the proposed algorithm. In red, is the derived service schedule and blue is the arrival times for arbitrary buses on the route at this bus stop. The inputs to the proposed algorithm are the arrival times (blue points) and the output is a set of derived service schedules (red points).

In one embodiment of the present invention, the effectiveness and efficiency of the schedules derived by the proposed algorithm may be calculated. First, several people traveling and utilizing the service schedules are simulated. Next, the percentage amount of time that the travelers catch or miss their desired bus is calculated.

Specifically, using the schedule, an arbitrary bus stop along an arbitrary route is selected to be utilized, and a traveler adhering to the derived schedule is simulated. In one example simulation, the simulated traveler proceeds to the bus stop 3 minutes before the schedule. For example, if the derived schedule for bus stop X on route W4 is 10:15 am, a traveler arriving at the bus stop 10:12 am is simulated. The traveler is simulated to arrive 3 minutes early as a predicted normal user would and also is simulated to have an upper bound on the wait time. The upper bound wait time may the standard deviation for that bus's arrival time as computed by the proposed Kmeans strategy. If the bus arrives earlier than 3 minutes before the schedule or later than the upper bound wait time, the traveler misses the bus. Otherwise, the traveler catches the bus. A percentage value representing the probability of catching a bus can then be computed. The final consideration is how to know when a bus arrives at a bus stop. To answer this question, after deriving our service schedules, an XML based REST API is used to inform the calculation when the bus arrives at the bus stop. When a bus is at a bus stop or close to bus stop, then expected arrival time is represented as "APPROACHING" in the API.

In one embodiment of the present invention, the apparatus 20 may be configured to generate a weekday specific schedule. In an alternative embodiment, the apparatus may be configured to generate a weekend specific schedule. Additionally or alternatively, the apparatus may be configured to receive a selection indicating a specific day, weekday or weekend, and generate a schedule specific to that day of the week.

In the context of the above example, for each stop $s_k$ along rt, a set of derived schedules $\{sch_1^{s_k}, sch_2^{s_k}, sch_3^{s_k}, \ldots, sch_m^{s_k}\}$ may be represented as $sch_{week\text{-}end}$ or $sch_{week\text{-}day}$. The entire service schedule may be $\{sch_1^{s_1}, sch_2^{s_1}, sch_3^{s_1}, \ldots, sch_m^{s_1}\}$, $\{sch_1^{s_2}, sch_2^{s_2}, sch_3^{s_2}, \ldots sch_m^{s_2}\}, \ldots, \{sch_1^{s_n}, sch_2^{s_n}, sch_3^{s_n}, \ldots, sch_m^{s_n}\}$ across all the routes in the transit service area.

In another embodiment of the present invention, the apparatus 20 may be configured to present a derived time table based schedule allowing extraction of frequencies of bus arrivals. Frequencies of bus arrivals are important, for example, in off-peak travel times.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for deriving an estimated time of arrival of a bus for a particular bus stop based on arrival times received from reports of location data, the method comprising:

causing reception of location data by a route derivation system comprising one or more processors and a communications interface, the location data received by a processor of the one or more processors via the communications interface and over a network, wherein the location data (a) comprises a plurality of Global Positioning System (GPS) location points and associated temporal data and (b) is captured by one or more localization devices, each localization device onboard a bus;

aggregating the location data, by the route derivation system, by route and direction to determine a trip count, the trip count being a number of trips along a route in a direction in a time period;

identifying a subset of the location data that is associated with a particular bus stop location, by the route derivation system, wherein an instance of location data that is associated with a particular bus stop is within a threshold distance of the particular bus stop location;

partitioning the temporal data associated with the subset of the location data associated with the particular bus stop location into one of a plurality of clusters, by the route derivation system, the number of clusters being equal to the trip count for the particular bus stop location, calculating an arrival time for each cluster based on each instance of associated temporal data assigned to the associated cluster, by the route derivation system;

generating, by the route derivation system, at least one service schedule for the particular bus stop, wherein the service schedule is comprised of the particular bus stop location and a plurality of bus arrival times, the bus arrival times being the arrival times for each associated cluster in the time period;

determining, by the route derivation system and based on the location data and the at least one service schedule, an estimated time of arrival of a bus at a particular bus stop location; and providing, by the route derivation system and via an application program interface, the estimated time of arrival of the bus at the particular bus stop to a computing device.

2. The method of claim 1, further comprising aggregating the location data by day of the week and generating (a) a weekday schedule, (b) a weekend schedule, or (c) both a weekday schedule and a weekend schedule.

3. The method of claim 1, wherein partitioning the temporal data comprises assigning an instance of location data to a cluster of the plurality of clusters having an arrival time closest to an arrival of the instance of location data.

4. The method of claim 1, wherein the particular bus stop location is determined based on the location data.

5. The method of claim 1, wherein the arrival time for a cluster is the mean arrival time calculated based on the temporal data of the cluster.

6. The method of claim 1, wherein the service schedule further comprises a variance for at least one of the plurality of bus arrival times, the variance determined based at least in part on the temporal data of a cluster corresponding to the bus arrival time.

7. The method of claim 1, further comprising:

re-partitioning the temporal data associated with each of the location points according to the calculated arrival time; and re-calculating the arrival time in accordance with the re-partitioned clusters.

8. The method of claim 1, further comprising determining a frequency of bus arrivals for the particular bus stop based on the service schedule.

9. An apparatus for deriving an estimated time of arrival of a bus for a particular bus stop based on arrival times received from reports of location data, the apparatus comprising at least one communications interface, at least one processor and at least one memory including computer program code, the at least one memory and the computer program code configured to, with the processor, cause the apparatus to at least:

receive location data, the location data received over a network via the communications interface, wherein the location data (a) comprises a plurality of Global Positioning System (GPS) location points and associated temporal data and (b) is captured by one or more localization devices, each localization device onboard a bus;

aggregate the location data by route and direction to determine a trip count, the trip count being a number of trips along a route in a direction in a time period;

identify a subset of the location data that is associated with a particular bus stop location, wherein an instance of location data that is associated with a particular bus stop is within a threshold distance of the particular bus stop location;

partition the temporal data associated with the subset of the location data associated with the particular bus stop location into one of a plurality of clusters, the number of clusters being equal to the trip count for the particular bus stop location, calculate an arrival time for each cluster based on each instance of associated temporal data assigned to the associated cluster;

generate at least one service schedule for the particular bus stop, wherein the service schedule is comprised of the particular bus stop location and a plurality of bus arrival times, the bus arrival times being the arrival times for each associated cluster in the time period;

determine, based on the location data and the at least one service schedule, an estimated time of arrival of a bus at the particular bus stop location; and provide, via the at least one communications interface and an application program interface, the estimated time of arrival of the bus at the particular bus stop to a computing device.

10. The apparatus of claim 9, wherein the at least one memory and the computer program code are further configured to, with the processor, cause the apparatus to at least aggregate the location data by day of the week and generating (a) a weekday schedule, (b) a weekend schedule, or (c) both a weekday schedule and a weekend schedule.

11. The apparatus of claim 9, wherein partitioning the temporal data comprises assigning an instance of location data to a cluster of the plurality of clusters having an arrival time closest to an arrival of the instance of location data.

12. The apparatus of claim 9, wherein the particular bus stop location is determined based on the location data.

13. The apparatus of claim 9, wherein the arrival time for a cluster is the mean arrival time calculated based on the temporal data of the cluster.

14. The apparatus of claim 9, wherein the service schedule further comprises a variance for at least one of the plurality of bus arrival times, the variance determined based at least in part on the temporal data of a cluster corresponding to the bus arrival time.

15. The apparatus of claim 9, wherein the at least one memory and the computer program code are further configured to, with the processor, cause the apparatus to at least:

re-partition the temporal data associated with each of the location points according to the calculated arrival time; and re-calculate the arrival time in accordance with the re-partitioned clusters.

16. The method of claim 1, further comprising determining a frequency of bus arrivals for the particular bus stop based on the service schedule.

17. A computer program product for deriving an estimated time of arrival of a bus for a particular bus stop based on arrival times received from reports of location data, the computer program product comprising at least one non-transitory computer-readable storage medium having computer-executable program code instructions stored therein with the computer-executable program code instructions comprising program code instructions configured to:

cause reception of location data, wherein the location data (a) comprises a plurality of Global Positioning System (GPS) location points and associated temporal data and (b) is captured by one or more localization devices, each localization device onboard a bus;

aggregate the location data by route and direction to determine a trip count, the trip count being a number of trips along a route in a direction in a time period;

identify a subset of the location data that is associated with a particular bus stop location, wherein an instance of location data that is associated with a particular bus stop is within a threshold distance of the particular bus stop location;

partition the temporal data associated with the subset of the location data associated with the particular bus stop location into one of a plurality of clusters, the number of clusters being equal to the trip count for the particular bus stop location, calculate an arrival time for each cluster based on each instance of associated temporal data assigned to the associated cluster;

generate at least one service schedule for the particular bus stop, wherein the service schedule is comprised of the particular bus stop location and a plurality of bus arrival times, the bus arrival times being the arrival times for each associated cluster in the time period;

determine, based on the location data and the at least one service schedule, an estimated time of arrival of a bus at the particular bus stop location; and provide, via the at least one communications interface and an application program interface, the estimated time of arrival of the bus at the particular bus stop to a computing device.

18. The computer program product of claim 17, wherein the computer-executable program code instructions further comprise program code instructions configured to aggregate the location data by day of the week and generating (a) a weekday schedule, (b) a weekend schedule, or (c) both a weekday schedule and a weekend schedule.

19. The computer program product of claim 17, wherein partitioning the temporal data comprises assigning an instance of location data to a cluster of the plurality of clusters having an arrival time closest to an arrival of the instance of location data.

20. The computer program product of claim 17, wherein the computer-executable program code instructions further comprise program code instructions configured to:

re-partition the temporal data associated with each of the location points according to the calculated arrival time; and re-calculate the arrival time in accordance with the re-partitioned clusters.

* * * * *